United States Patent
Thompson

(10) Patent No.: US 7,831,736 B1
(45) Date of Patent: Nov. 9, 2010

(54) SYSTEM AND METHOD FOR SUPPORTING VLANS IN AN ISCSI

(75) Inventor: David P. Thompson, Rogers, MN (US)

(73) Assignee: Cisco Technology, Inc., San Jose, CA (US)

( * ) Notice: Subject to any disclaimer, the term of this patent is extended or adjusted under 35 U.S.C. 154(b) by 1071 days.

(21) Appl. No.: 10/375,411

(22) Filed: Feb. 27, 2003

(51) Int. Cl.
  *G06F 15/16* (2006.01)
(52) U.S. Cl. ............ 709/249; 709/238; 709/248; 709/250
(58) Field of Classification Search ......... 709/220–221, 709/226–228, 230, 223, 238, 248–250
  See application file for complete search history.

(56) References Cited

U.S. PATENT DOCUMENTS

| | | | |
|---|---|---|---|
| 4,495,617 A | 1/1985 | Ampulski et al. |
| 5,390,326 A | 2/1995 | Shah |
| 5,461,608 A | 10/1995 | Yoshiyama |
| 5,473,599 A | 12/1995 | Li et al. |
| 5,535,395 A | 7/1996 | Tipley et al. |
| 5,544,077 A | 8/1996 | Hershey |
| 5,579,491 A | 11/1996 | Jeffries et al. |
| 5,600,828 A | 2/1997 | Johnson et al. |
| 5,666,486 A | 9/1997 | Alfieri et al. |
| 5,732,206 A | 3/1998 | Mendel |
| 5,812,821 A | 9/1998 | Sugi et al. |
| 5,870,571 A | 2/1999 | Duburcq et al. |
| 5,909,544 A | 6/1999 | Anderson et al. |
| 5,941,972 A | 8/1999 | Hoese et al. |
| 5,951,683 A | 9/1999 | Yuuki et al. |
| 5,991,813 A | 11/1999 | Zarrow |
| 5,996,024 A | 11/1999 | Blumenau |
| 5,996,027 A | 11/1999 | Volk et al. |
| 6,006,259 A | 12/1999 | Adelman et al. |
| 6,009,476 A | 12/1999 | Flory et al. |
| 6,018,765 A | 1/2000 | Durana et al. |
| 6,041,381 A | 3/2000 | Hoese |
| 6,078,957 A | 6/2000 | Adelman et al. |
| 6,108,300 A | 8/2000 | Coile et al. |
| 6,108,699 A | 8/2000 | Moiin |
| 6,131,119 A | 10/2000 | Fukui |
| 6,134,673 A | 10/2000 | Chrabaszcz |
| 6,145,019 A | 11/2000 | Firooz et al. |
| 6,163,855 A | 12/2000 | Shrivastava et al. |
| 6,178,445 B1 | 1/2001 | Dawkins et al. |
| 6,185,620 B1 | 2/2001 | Weber et al. |

(Continued)

OTHER PUBLICATIONS

*VMware ESX Server: User's Manual*, Version 1.0, obtained from http://web.archive.org/web/20010608201203/www.vmware.com/support,(Jun. 6, 2001), 122-124.

(Continued)

*Primary Examiner*—Faruk Hamza
(74) *Attorney, Agent, or Firm*—Schwegman, Lundberg & Woessner, P.A.

(57) ABSTRACT

Systems and methods for providing VLAN support in an iSCSI environment are disclosed. The systems and methods support associating multiple SCSI routing components in a storage router with multiple VLANs. Target devices on a storage area network are thus only present on the VLAN associated with the SCSI routing component that maps the target devices.

11 Claims, 6 Drawing Sheets

U.S. PATENT DOCUMENTS

| | | | |
|---|---|---|---|
| 6,195,687 | B1 | 2/2001 | Greaves et al. |
| 6,195,760 | B1 | 2/2001 | Chung et al. |
| 6,209,023 | B1 | 3/2001 | Dimitroff et al. |
| 6,219,771 | B1 | 4/2001 | Kikuchi et al. |
| 6,268,924 | B1 | 7/2001 | Koppolu et al. |
| 6,269,396 | B1 | 7/2001 | Shah et al. |
| 6,314,526 | B1 | 11/2001 | Arendt et al. |
| 6,343,320 | B1 | 1/2002 | Fairchild et al. |
| 6,363,416 | B1 | 3/2002 | Naeimi et al. |
| 6,378,025 | B1 | 4/2002 | Getty |
| 6,393,583 | B1 | 5/2002 | Meth et al. |
| 6,400,730 | B1 | 6/2002 | Latif et al. |
| 6,421,753 | B1 | 7/2002 | Hoese et al. |
| 6,425,035 | B2 | 7/2002 | Hoese et al. |
| 6,425,036 | B2 | 7/2002 | Hoese et al. |
| 6,449,652 | B1 | 9/2002 | Blumenau et al. |
| 6,470,382 | B1 | 10/2002 | Wang et al. |
| 6,470,397 | B1 | 10/2002 | Shah et al. |
| 6,473,803 | B1 | 10/2002 | Stern et al. |
| 6,480,901 | B1 | 11/2002 | Weber et al. |
| 6,484,245 | B1 | 11/2002 | Sanada et al. |
| 6,553,408 | B1 | 4/2003 | Merrell et al. |
| 6,574,755 | B1 | 6/2003 | Seon |
| 6,591,310 | B1 | 7/2003 | Johnson |
| 6,597,956 | B1 | 7/2003 | Aziz et al. |
| 6,640,278 | B1 | 10/2003 | Nolan et al. |
| 6,654,830 | B1 | 11/2003 | Taylor et al. |
| 6,658,459 | B1 | 12/2003 | Kwan et al. |
| 6,678,721 | B1 | 1/2004 | Bell |
| 6,683,883 | B1 | 1/2004 | Czeiger et al. |
| 6,691,244 | B1 | 2/2004 | Kampe et al. |
| 6,697,924 | B2 | 2/2004 | Swank |
| 6,701,449 | B1 | 3/2004 | Davis et al. |
| 6,718,361 | B1 | 4/2004 | Basani et al. |
| 6,721,907 | B2 | 4/2004 | Earl |
| 6,724,757 | B1 | 4/2004 | Zadikian et al. |
| 6,738,854 | B2 | 5/2004 | Hoese et al. |
| 6,748,550 | B2 | 6/2004 | McBrearty et al. |
| 6,757,291 | B1 | 6/2004 | Hu |
| 6,760,783 | B1 | 7/2004 | Berry |
| 6,763,195 | B1 | 7/2004 | Willebrand et al. |
| 6,763,419 | B2 | 7/2004 | Hoese et al. |
| 6,771,663 | B1 | 8/2004 | Jha |
| 6,771,673 | B1 | 8/2004 | Baum et al. |
| 6,779,016 | B1 * | 8/2004 | Aziz et al. ............... 709/201 |
| 6,785,742 | B1 * | 8/2004 | Teow et al. ............... 710/1 |
| 6,789,152 | B2 | 9/2004 | Hoese et al. |
| 6,799,316 | B1 | 9/2004 | Aguilar et al. |
| 6,807,581 | B1 | 10/2004 | Starr et al. |
| 6,823,418 | B2 | 11/2004 | Langendorf et al. |
| 6,839,752 | B1 | 1/2005 | Miller et al. |
| 6,845,403 | B2 | 1/2005 | Chadalapaka |
| 6,848,007 | B1 * | 1/2005 | Reynolds et al. ........... 709/245 |
| 6,856,591 | B1 | 2/2005 | Ma et al. |
| 6,859,462 | B1 | 2/2005 | Mahoney et al. |
| 6,877,044 | B2 | 4/2005 | Lo et al. |
| 6,886,171 | B2 | 4/2005 | MacLeod |
| 6,895,461 | B1 | 5/2005 | Thompson |
| 6,920,491 | B2 | 7/2005 | Kim |
| 6,938,092 | B2 | 8/2005 | Burns |
| 6,941,396 | B1 | 9/2005 | Thorpe et al. |
| 6,944,785 | B2 | 9/2005 | Gadir et al. |
| 6,976,134 | B1 | 12/2005 | Lolayekar et al. |
| 7,043,727 | B2 | 5/2006 | Bennett et al. |
| 7,089,293 | B2 | 8/2006 | Grosner et al. |
| 7,120,837 | B1 | 10/2006 | Ferris |
| 7,146,233 | B2 * | 12/2006 | Aziz et al. ............... 700/101 |
| 7,165,258 | B1 * | 1/2007 | Kuik et al. ............... 719/326 |
| 7,188,194 | B1 * | 3/2007 | Kuik et al. ............... 709/249 |
| 7,281,062 | B1 * | 10/2007 | Kuik et al. ............... 709/249 |
| 7,353,260 | B1 * | 4/2008 | Senum ................... 709/217 |
| 7,428,613 | B1 * | 9/2008 | Justiss et al. ............. 711/114 |
| 7,437,477 | B2 | 10/2008 | Kuik et al. |
| 7,451,208 | B1 * | 11/2008 | Bakke et al. ............. 709/224 |
| 7,506,073 | B2 * | 3/2009 | Kuik et al. ............... 709/249 |
| 2001/0020254 | A1 | 9/2001 | Blumenau et al. |
| 2002/0010750 | A1 | 1/2002 | Baretzki |
| 2002/0010812 | A1 | 1/2002 | Hoese et al. |
| 2002/0042693 | A1 | 4/2002 | Kampe et al. |
| 2002/0049845 | A1 | 4/2002 | Sreenivasan et al. |
| 2002/0052986 | A1 | 5/2002 | Hoese et al. |
| 2002/0055978 | A1 | 5/2002 | Joon-Bo et al. |
| 2002/0059392 | A1 | 5/2002 | Ellis |
| 2002/0065872 | A1 | 5/2002 | Genske et al. |
| 2002/0103943 | A1 | 8/2002 | Lo et al. |
| 2002/0116460 | A1 | 8/2002 | Treister et al. |
| 2002/0126680 | A1 | 9/2002 | Inagaki et al. |
| 2002/0156612 | A1 | 10/2002 | Schulter et al. |
| 2002/0161950 | A1 | 10/2002 | Hoese et al. |
| 2002/0176434 | A1 | 11/2002 | Yu et al. |
| 2002/0188657 | A1 | 12/2002 | Traversat et al. |
| 2002/0188711 | A1 | 12/2002 | Meyer et al. |
| 2002/0194428 | A1 | 12/2002 | Green |
| 2003/0005068 | A1 | 1/2003 | Nickel et al. |
| 2003/0014462 | A1 | 1/2003 | Bennett et al. |
| 2003/0018813 | A1 | 1/2003 | Antes et al. |
| 2003/0018927 | A1 | 1/2003 | Gadir et al. |
| 2003/0058870 | A1 | 3/2003 | Mizrachi et al. |
| 2003/0084209 | A1 | 5/2003 | Chadalapaka |
| 2003/0093541 | A1 | 5/2003 | Lolayekar et al. |
| 2003/0093567 | A1 | 5/2003 | Lolayekar et al. |
| 2003/0097607 | A1 | 5/2003 | Bessire |
| 2003/0131157 | A1 | 7/2003 | Hoese et al. |
| 2003/0149829 | A1 | 8/2003 | Basham et al. |
| 2003/0163682 | A1 | 8/2003 | Kleinsteiber et al. |
| 2003/0182455 | A1 | 9/2003 | Hetzler et al. |
| 2003/0208579 | A1 | 11/2003 | Brady et al. |
| 2003/0210686 | A1 | 11/2003 | Terrell et al. |
| 2003/0212898 | A1 * | 11/2003 | Steele et al. ............. 713/200 |
| 2003/0229690 | A1 * | 12/2003 | Kitani et al. ............. 709/223 |
| 2003/0233427 | A1 | 12/2003 | Taguchi |
| 2003/0236988 | A1 | 12/2003 | Snead |
| 2004/0022256 | A1 | 2/2004 | Green |
| 2004/0024778 | A1 | 2/2004 | Cheo |
| 2004/0064553 | A1 | 4/2004 | Kjellberg |
| 2004/0085893 | A1 | 5/2004 | Wang et al. |
| 2004/0117438 | A1 | 6/2004 | Considine et al. |
| 2004/0141468 | A1 | 7/2004 | Christensen |
| 2004/0148376 | A1 | 7/2004 | Rangan et al. |
| 2004/0233910 | A1 | 11/2004 | Chen et al. |
| 2005/0055418 | A1 | 3/2005 | Blanc et al. |
| 2005/0063313 | A1 | 3/2005 | Nanavati et al. |
| 2005/0268151 | A1 | 12/2005 | Hunt et al. |
| 2007/0112931 | A1 | 5/2007 | Kuik et al. |

OTHER PUBLICATIONS

"Cisco SN 5420 Storage Router Hardware Installation Guide", *Cisco Systems, Inc.*, (2001),98 pgs.

"Cisco SN 5428 Storage Router Hardware Installation Guide", http://www.cisco.com, (2003),76 pgs.

"High Availability for Cisco SN 5420 Storage Router-Based iSCSI Solutions", http://www.cisco.com, Cisco Systems, Inc.,(Jan. 2002), 1-32.

"News Release: Cisco Introduces the Cisco SN 5428 Storage Router", http://newsroom.cisco.com/dlls/prod_051402b.html, (May 14, 2002),3 p.

"News Release: Cisco SN 5420 Storage Router Delivers iSCSI to Storage Networking", *Cisco Systems*, (Apr. 9, 2001),3 pgs.

Bakker, G. , *IP Aliasing*, obtained from http://www.zone-h.org/files/24/ip_aliasing.txt,(1999),3 p.

Gusella, R. , et al., "An Election Algorithm for a Distributed Clock Synchronization Program", *Report No. UCB/CSD 86/257*, University of California, Berkeley,(Dec. 1985),1-17.

Gusella, R., et al., "The Berkeley UNIX Time Synchronization Protocol", *UNIX Programmers Manual 4.3*, vol. 2C, Berkeley Software Distrib.,,(1986),10 p.

Knight, S., et al., *Virtual Router Redundancy Protocol*, Network Working Group, RFC 2338, obtained from http://www.search.ietf.org/rfc/rfc2338.txt,(1998),26 p.

Lewis, P., "A High-Availability Cluster for Linux", *Linux Journal, 64,* obtained from http://www2.linuxjournal.com/lj-issues/issue64/3247.html,(Apr. 1994),11 p.

Li, T., et al., *Cisco Hot Standby Router Protocol (HSRP)*, Network Working Group, RFC 2281, obtained from http://www.search.ietf.org/rfc/rfc2281.txt,(1998), 16 p.

Meth, K. Z., et al., "Design of the iSCSI protocol", *Proceedings of the 20th IEEE Conference on Mass Storage Systems and Technologies,* (Apr. 7-10, 2003),116-122.

Moore, K., *On the Use of HTTP as a Substrate*, Network Working Group, RFC 3205, obrtained from http://www.search.ietf.org/rfc/rfc3205.txt,(2002), 14 p.

Satran, J., et al., *iSCSI*, IPS Internet Draft, draft-ietf-ips-iSCSI-12.txt, Category: standards—track,(Apr. 17, 2002),260 p.

Satran, J., et al., *iSCSI*, IPS Internet Draft, draft-ietf-ips-iSCSI-00, Category: Standards Track, obtained from http://www.haifa.il.ilb.com/satran/ips/draft-ietf-ips-iSCSI-00.txt,(Nov. 2000),78 p.

Simitci, H., et al., "Evaluation of SCSP over TCP/IP and SCSI over fibre channel connections", *Hot Interconnects, 9,* (Aug. 2001),87-91.

"Implementing Switch Fabrics in FPGAs", *Altera Corporation,* (2002), 33 pages.

US 7,366,791, 04/2008, Kuik et al. (withdrawn)

* cited by examiner

SYSTEM AND METHOD FOR SUPPORTING VLANS IN AN ISCSI

FIELD

The present invention relates generally to computer systems supporting the ISCSI protocol, and in particular to supporting VLANs on such computer systems.

RELATED FILES

This invention is related to application Ser. No. 10/128,656, filed Apr. 22, 2002, now U.S. Pat. No. 7,165,258, issued Jan. 16, 2007, entitled "SCSI-BASED STORAGE AREA NETWORK", application Ser. No. 10/131,793, filed Apr. 22, 2002, entitled "VIRTUAL SCSI BUS FOR SCSI-BASED STORAGE AREA NETWORK", provisional application Ser. No. 60/374,921, filed Apr. 22, 2002, entitled "INTERNET PROTOCOL CONNECTED STORAGE AREA NETWORK", and application Ser. No. 10/356,073, filed Jan. 31, 2003, entitled "INTEGRATED STORAGE ROUTER AND FIBRE CHANNEL SWITCH", all of the above of which are hereby incorporated by reference.

BACKGROUND

The use of Storage Area Networks (SANs) continues to grow. Generally described, a SAN is a specialized network of storage devices that are connected to each other and to a server through, or cluster of servers, which act as an access point to the SAN. In some configurations a SAN is also connected to the network. SAN's use special switches as a mechanism to connect the storage devices. A SAN provides many advantages to users requiring large amounts of storage. First, a SAN helps to isolate storage activity from a general purpose network. For example, a SAN can be providing data to users on the general purpose network at the same time it is being backed up for archival purposes. The data traffic associated with the backup does not compete for bandwidth on the general purpose network, it typically stays on the specialized network.

An additional advantage is that a SAN can be reconfigured, i.e. storage can be added or removed, without disturbing hosts on the general purpose network.

A further trend in network technology is the increasing use of Virtual Local Area Networks. A VLAN is a network of devices that behave as if they are connected to the same physical segment of a LAN even though they may actually be physically located on different segments of the LAN. VLANs are typically configured through software rather than hardware, which makes a VLAN extremely flexible. One of the biggest advantages of VLANs is that when a computer is physically moved to another location, it can stay on the same VLAN without any hardware reconfiguration. A further advantage of VLANs is that they provide an additional level of security in that network data on one VLAN is not visible to devices on a different VLAN.

In currently available systems, there has been no integration of SAN technology with VLAN technology. As a result, there is a need in the art for the present invention.

SUMMARY

The above-mentioned shortcomings, disadvantages and problems are addressed by the present invention, which will be understood by reading and studying the following specification.

Various embodiments of the present invention include systems and methods for providing VLAN support in an iSCSI environment. The systems and methods support associating multiple SCSI routing components in a storage router with multiple VLANs. Target devices on a storage area network are thus only present on the VLAN associated with the SCSI routing component that maps the target devices.

One aspect of the present invention is a method for accessing iSCSI targets over a network. The method begins by providing a network interface that supports a plurality of VLANs on a physical network. An iSCSI routing component may be communicably coupled to the network interface. The iSCSI routing component will typically have a network address associated with a first VLAN of the plurality of VLANs and will be further communicably coupled to a SAN (Storage Area Network) interface. The iSCSI routing component typically provides a mapping between a first host on the first VLAN to at least one device on the SAN;

In a further aspect of the invention, network data between the first host and the device is routed through the iSCSI routing component. The network data may be processed by tagging an iSCSI network packet with the first VLAN tag and sending the iSCSI network packet to a host on the first VLAN.

In a still further aspect of the present invention, network data is processed by receiving an iSCSI network packet with the first VLAN tag and determining if first VLAN tag is valid. If the VLAN tag is valid, it is sent to the appropriate iSCSI routing component.

The present invention describes systems, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention.

Some portions of the detailed descriptions that follow are presented in terms of algorithms and symbolic representations of operations on data bits within a computer memory.

These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component which appears in multiple Figures. Signals and connections may be referred to by the same reference number or label, and the actual meaning will be clear from its use in the context of the description.

The following detailed description is, therefore, not to be taken in a limiting sense, and the scope of the present invention is defined only by the appended claims.

Operating Environment

Figure 1:
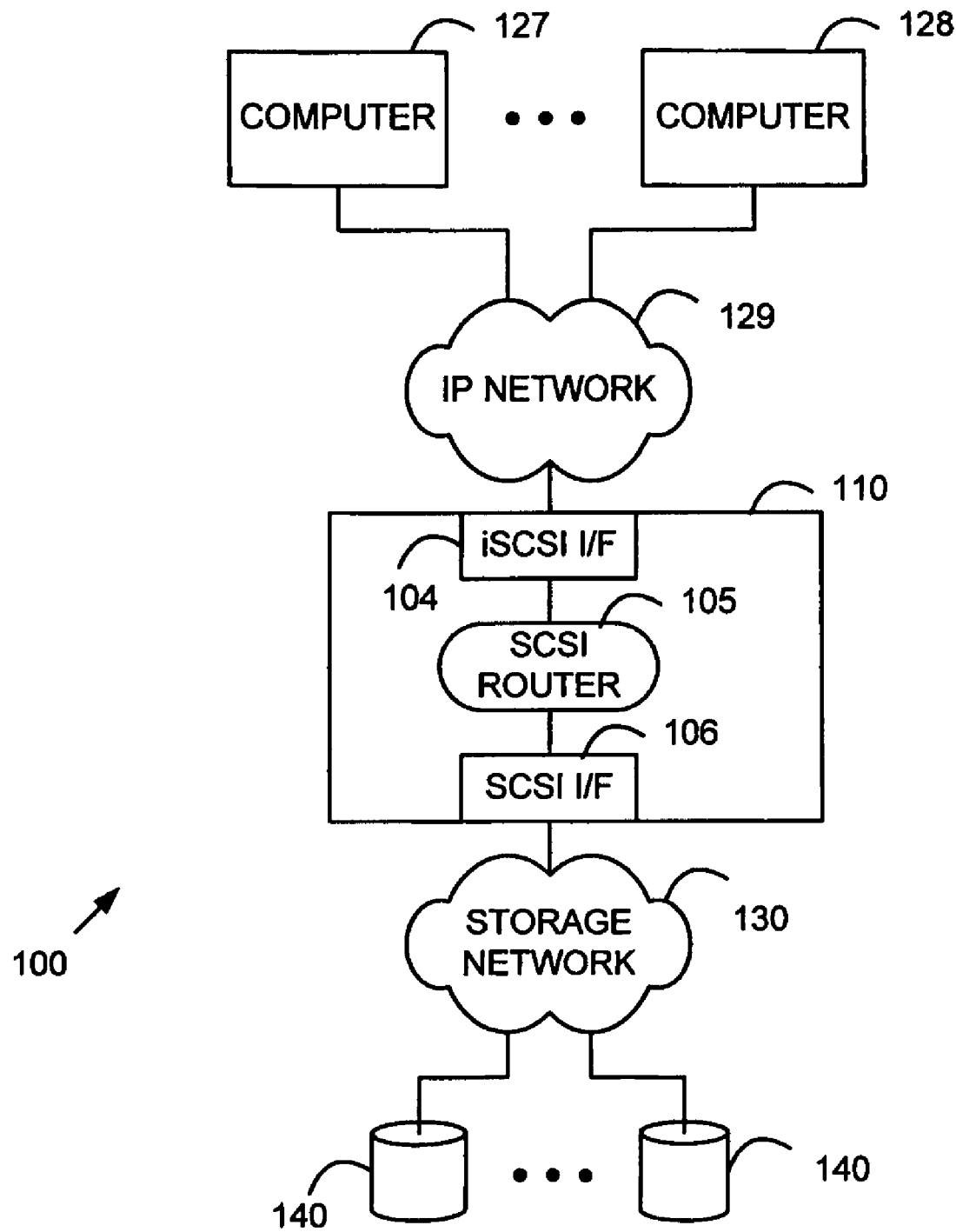
FIG. 1 is a block diagram of a storage router hardware and operating environment in which different embodiments of the invention can be practiced.

Some embodiments of the invention operate in an environment of systems and methods that provide a means for Fibre Channel based Storage Area Networks (SANs) to be accessed from TCP/IP network hosts. FIG. 1 is a block diagram describing the major components of such a system. Storage router system 100 includes computers (127, 128) connected through an IP network 129 to storage router 110. Storage router 110 is connected in turn through storage network 130 to one or more SCSI devices 140. In the embodiment shown in FIG. 1, storage router 110 includes an iSCSI interface 104, a SCSI router 105 and a SCSI interface 106. iSCSI interface 104 receives encapsulated SCSI packets from IP network 129, extracts the SCSI packet and send the SCSI packet to SCSI router 105. SCSI interface 106 modifies the SCSI packet to conform to its network protocol (e.g., Fibre Channel, parallel SCSI, or iSCSI) and places the modified SCSI packet onto storage network 130. The SCSI packet is then delivered to its designated SCSI device 140.

In one embodiment, storage router 110 provides IPv4 router functionality between a Gigabit Ethernet and a Fibre Channel interface. In one such embodiment, static routes are supported. In addition, storage router 110 supports a configurable MTU size for each interface, and has the ability to reassemble and refragment IP packets based on the MTU of the destination interface.

In one embodiment, storage router 110 acts as a gateway, converting SCSI protocol between Fibre Channel and TCP/IP. Storage router 110 is configured in such an embodiment to present Fibre Channel devices as iSCSI targets, providing the ability for clients on the IP network to directly access storage devices.

In one embodiment, SCSI routing occurs in the Storage Router 110 through the mapping of physical storage devices to iSCSI targets. An iSCSI target (also called logical target) is an arbitrary name for a group of physical storage devices. Mappings between an iSCSI target to multiple physical devices can be established using configuration programs on storage router 110. An iSCSI target always contains at least one Logical Unit Number (LUN). Each LUN on an iSCSI target is mapped to a single LUN on a physical storage target.

Figure 2:
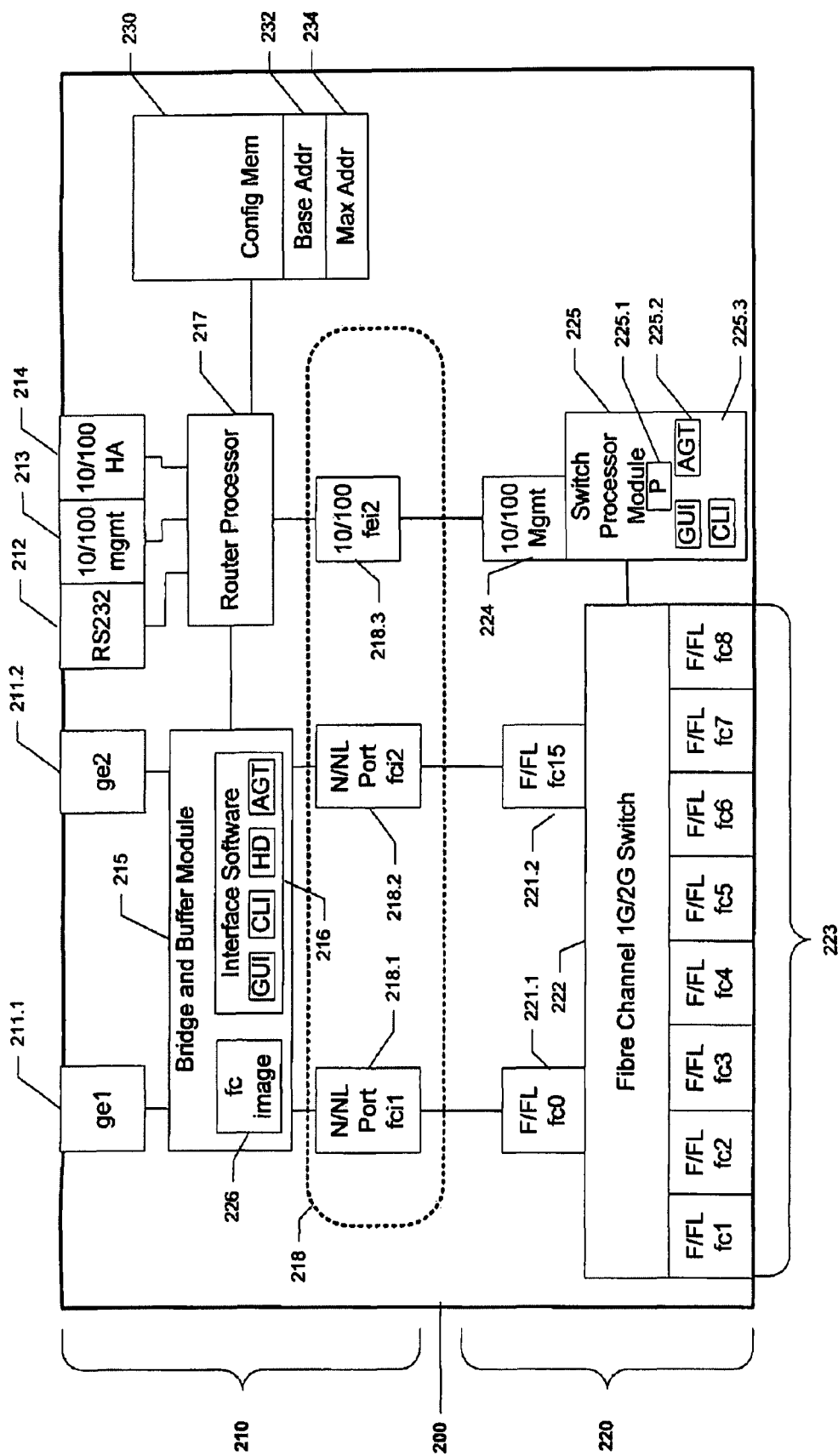
FIG. 2 is a block diagram of the major hardware components of a storage router according to an embodiment of the invention.

FIG. 2 is a block diagram providing further details of the major hardware components comprising storage router 110. In some embodiments, storage router 110 includes a router portion 210 and a switch portion 220 on a common motherboard 200. The motherboard is powered by a power supply (not shown) and cooled by common cooling system, such as a fan (also not shown).

Router portion 210, which in the exemplary embodiment complies with draft 08 and later versions of the iSCSI protocol and incorporates commercially available router technology, such as the 5420 and 5428 Storage Routers from Cisco Systems, Inc. of San Jose, Calif., includes Gigabit Ethernet (GE) ports 211.1 and 211.2, console port 212, management port 213, high-availability (HA) port 214, bridge-and-buffer module 215, interface software 216, router processor 217, and router-to-switch interface 218.

GE ports 211.1 and 211.2 couple the storage router to an IP network for access by one or more servers or other computers, such as servers or iSCSI hosts (in FIG. 1). In some embodiments, GE ports 211.1 and 211.2 have respective MAC addresses, which are determined according to a base MAC address for the storage router plus 31 minus the respective port number. Two ore more Gigabit Ethernet interfaces may be available. In some embodiments, one or more of the Gigabit Ethernet interfaces may provide internal support for maintaining Virtual Local Area Networks (VLANs). Each SCSI router typically supports a single IP address. The SCSI router IP address may be tied to any network (or VLAN) on either GE interface. Generally at least one SCSI router instance is created for each GE interface.

Console port 212 couples to a local control console (not shown). In the exemplary embodiment, this port takes the form of an RS-232 interface.

Management port 213 provides a connection for managing and/or configuring storage router 110. In the exemplary embodiment, this port takes the form of a 10/100 Ethernet port and may be assigned the base MAC address for the router-switch.

HA port 214 provides a physical connection for high-availability communication with another router-switch, such as storage router 110 in FIG. 1. In the exemplary embodiment, this port takes the form of a 10/100 Ethernet port, and is assigned the base MAC address plus 1.

Bridge-and-buffer module 215, which is coupled to GE ports 211.1 and 211.2, provides router services that are compliant with draft 08 and later versions of the iSCSI protocol. In the exemplary embodiment, module 215 incorporates a Peripheral Component Interface (PCI) bridge, such as the GT64260 from Marvell Technology Group, LTD. of Sunnyvale, Calif. Also module 215 includes a 64-megabyte flash file system, a 1-megabyte boot flash, and a 256-megabyte non-volatile FLASH memory (not shown separately.) Configuration memory 230 may be part of the flash file system, the boot flash or the non-volatile flash memory, or it may be a separate non-volatile flash memory. In addition, in alternative embodiments, configuration memory 230 may be part of a hard disk, CD-ROM, DVD-ROM or other persistent memory (not shown). The invention is not limited to any particular type of memory for configuration memory 230.

In addition to data and other software used for conventional router operations, module 215 includes router-switch interface software 216. Router-switch software 216 performs iSCSI routing between servers and the storage devices. The software includes an integrated router-switch command line interface module CLI and a web-based graphical-user-interface module (GUI) for operation, configuration and administration, maintenance, and support of the router-switch 110. Both the command-line interface and the graphical user interface are accessible from a terminal via one or both of the ports 213 and 214. Additionally, to facilitate management activities, interface software 216 includes an SNMP router-management agent AGT and an MIB router handler HD. (SNMP denotes the Simple Network Management Protocol, and MIB denotes Management Information Base (MIB)). The agent and handler cooperate with counterparts in switch portion 220 (as detailed below) to provide integrated management and control of router and switching functions in router-switch 200.

Router Processor 217, in the exemplary embodiment, is implemented as a 533-MHz MPC7410 PowerPC from Motorola, Inc. of Schaumburg, Ill. This processor includes 1-megabyte local L2 cache (not shown separately). In the exemplary embodiment, router processor 217 runs a version of the VX Works operating system from WindRiver Systems, Inc. of Alameda, Calif. To support this operating system, the exemplary embodiment also provides means for isolating file allocations tables from other high-use memory areas (such as areas where log and configuration files are written).

Coupled to router processor 217 as well as to bridge-and-buffer module 215 is router-to-switch (RTS) interface 218. RTS interface 218 includes N/NL switch-interface ports 218.1 and 218.2 and management-interface port 218.3, where the port type of N or NL is determined by negotiation. N type ports may act as a Fibre Channel point to point port, NL type ports may negotiate as a loop.

Switch-interface ports 218.1 and 218.2 are internal Fibre Channel (FC) interfaces through which the router portion conducts I/O operations with the switch portion. When a mapping to a FC storage device is created, the router-switch software automatically selects one of the switch-interface ports to use when accessing the target device. The internal interfaces are selected at random and evenly on a per-LUN (logical unit number) basis, allowing the router-switch to load-balance between the two FC interfaces. The operational status of these internal FC interfaces is monitored by each active SCSI Router application running on the switch-router. The failure of either of these two interfaces is considered a unit failure, and if the switch-router is part of a cluster, all active SCSI Router applications will fail over to another switch-router in the cluster. Other embodiments allow operations to continue with the remaining switch-interface port. Still other embodiments include more than two switch-interface ports.

In the exemplary embodiment, the N/NL switch-interface ports can each use up to 32 World Wide Port Names (WWPNs). The WWPNs for port 218.1 are computed as 28+virtual port+base MAC address, and the WWPNs for port 218.2 are computed as 29+virtual port+base MAC address. Additionally, switch-interface ports 218.1 and 218.2 are hidden from the user. One exception is the WWPN of each internal port. The internal WWPNs are called "initiator" WWPNs. Users who set up access control by WWPN on their FC devices set up the device to allow access to both initiator WWPNs.

Switch-interface port 218.3 is used to exchange configuration data and get operational information from switch portion 220 through its management-interface port 224. In the exemplary embodiment, switch-interface port 218.3 is an 10/100 Ethernet port. In the exemplary embodiment, this exchange occurs under the control of a Switch Management Language (SML) Application Program Interface (API) that is part of interface software 216. One example of a suitable API is available from QLogic Corporation of Aliso Viejo, Calif. Ports 218.1, 218.2, and 218.3 are coupled respectively to FC interface ports 221.1 and 221.2 and interface port 224 of switch portion 220.

Switch portion 220, which in the exemplary embodiment incorporates commercially available technology and supports multiple protocols including IP and SCSI, additionally includes internal FC interface ports 221.1 and 221.2, an FC switch 222, external FC ports (or interfaces) 223.1-223.8, a management interface port 224, and a switch processor module 225.

FC interface ports 221.1 221.2 are coupled respectively to ports of 218.1 and 218.2 of the router-to-switch interface via internal optical fiber links, thereby forming internal FC links. In the exemplary embodiment, each FC interface supports auto-negotiation as either an F or FL port.

FC switch 222, in the exemplary embodiment, incorporates a SANbox2-16 FC switch from QLogic Corporation. This SANbox2 switch includes QLogic's Itasca switch ASIC (application-specific integrated circuit.) Among other things, this switch supports Extended Link Service (ELS) frames that contain manufacturer information.

FC ports 223.1-223.8, which adhere to one or more FC standards or other desirable communications protocols, can be connected as point-to-point links, in a loop or to a switch. For flow control, the exemplary embodiment implements a Fibre Channel standard that uses a look-ahead, sliding-window scheme, which provides a guaranteed delivery capability. In this scheme, the ports output data in frames that are limited to 2148 bytes in length, with each frame having a header and a checksum. A set of related frames for one operation is called a sequence.

Moreover, the FC ports are auto-discovering and self-configuring and provide 2-Gbps full-duplex, auto-detection for compatibility with 1-Gbps devices. For each external FC port, the exemplary embodiment also supports: Arbitrated Loop (AL) Fairness; Interface enable/disable; Linkspeed settable to 1 Gbps, 2 Gbps, or Auto; Multi-Frame Sequence bundling; Private (Translated) Loop mode.

Switch processor module 225 operates the FC switch and includes a switch processor (or controller) 225.1, and associated memory that includes a switch management agent 225.2, and a switch MIB handler 225.3. In the exemplary embodiment, switch processor 225.1 includes an Intel Pentium processor and a Linux operating system. Additionally, processor 225 has its own software image, initialization process, configuration commands, command-line interface, and graphical user interface (not shown). (In the exemplary embodiment, this command-line interface and graphical-user interface are not exposed to the end user.) A copy of the switch software image for the switch portion is maintained as a tar file 226 in bridge-and-buffer module 215 of router portion 210.

Further details on the operation of the above describe system, including high availability embodiments can be found in application Ser. No. 10/128,656, entitled "SCSI-BASED STORAGE AREA NETWORK", application Ser. No. 10/131,793, entitled "VIRTUAL SCSI BUS FOR SCSI- BASED STORAGE AREA NETWORK", and provisional application Ser. No. 60/374,921, entitled "INTERNET PROTOCOL CONNECTED STORAGE AREA NETWORK", all of which have been previously incorporated by reference.

Figure 3:
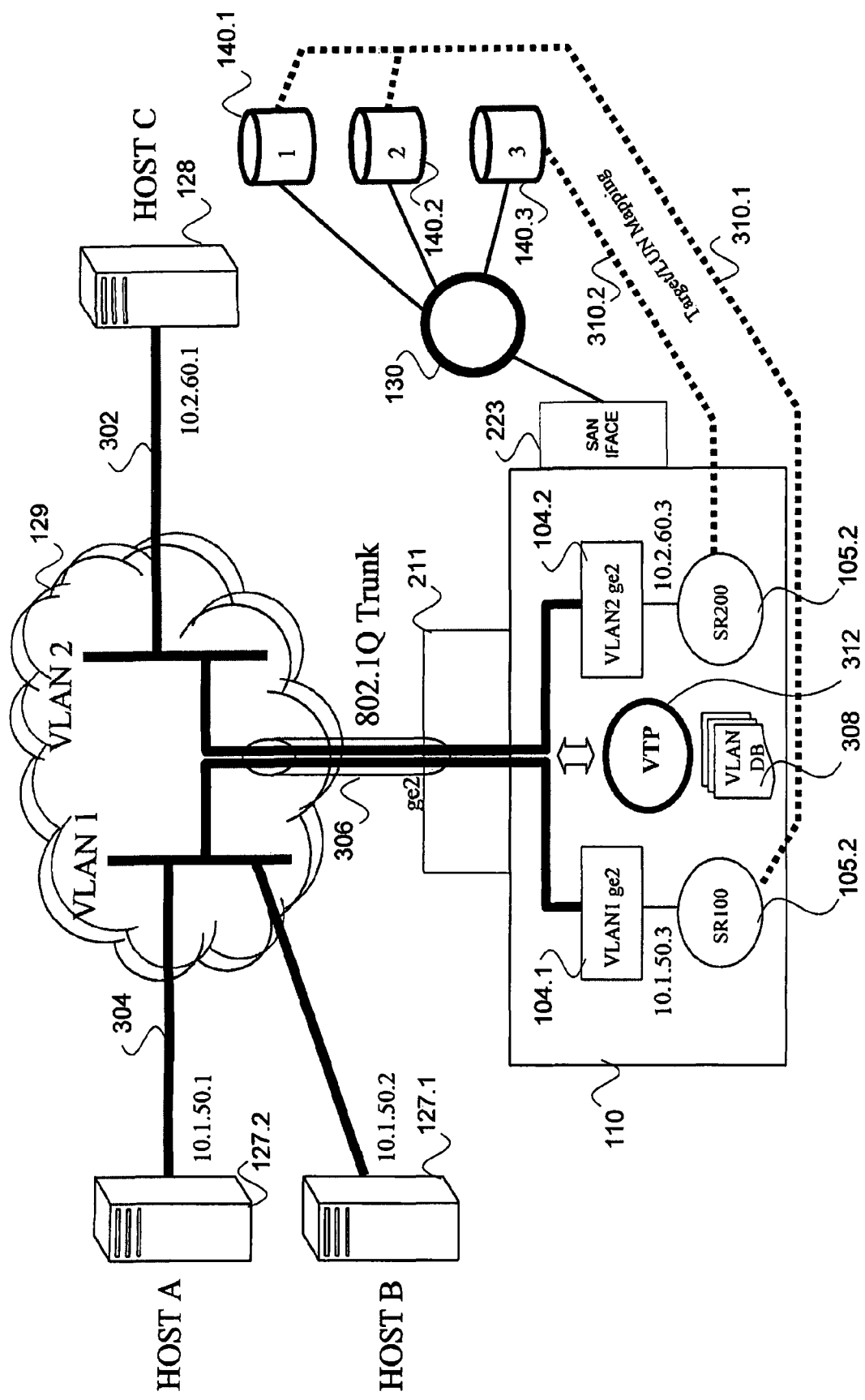
FIG. 3 is a block diagram illustrating a configuration of a storage router in a VLAN environment according to an embodiments of the invention.

FIG. 3 is a diagram illustrating the operation of a storage router 110 within an exemplary VLAN environment 300 according to an embodiment of the invention. In the exemplary environment, devices on network 129 have been configured such that two VLANs, VLAN 302 and VLAN 304 exist over network 129. Specifically, host 127.1 and host 127.2 are configured such that they belong to VLAN 304, and host 128 is configured such that it is on VLAN 302.

Storage router 110 may also be configured to run in VLAN environment 300. In some embodiments, VLAN configuration data is maintained in a VLAN database 308. In this example, iSCSI interface 104.1 for SCSI router 105.1 has been configured such that it is on VLAN 304, and iSCSI interface 104.2 for SCSI router 105.2 has been configured such that it is on VLAN 302. Further, Gigabit Ethernet interface 211 has been configured to handle network data that conforms to a VLAN protocol. In some embodiments of the invention, the VLAN protocol is the IEEE 802.1Q protocol, and GE interface 211 creates an 802.1Q trunk to network 129. However, the invention is not limited to any particular VLAN protocol, other VLAN protocols and protocol adaptations may be substituted for the 802.1Q protocol.

In further embodiments of the invention, the GE interface supports the VLAN Trunk Protocol (VTP). VTP is a protocol developed by Cisco Systems, Inc., and is used to propagate VLAN information around a network using network layer 2 multicast packets. The use of VTP provides a mechanism for storage router 110 to dynamically learn from an attached switch the VLANs that have been externally configured. In some embodiments of the invention, a VTP process 312 manages information regarding VLANs configured and/or available for storage router 110 and maintains such information in VLAN database 308. Using this information, interfaces for the discovered VLANs can then be locally configured and mapped to SCSI router instances 105.

Figure 4:
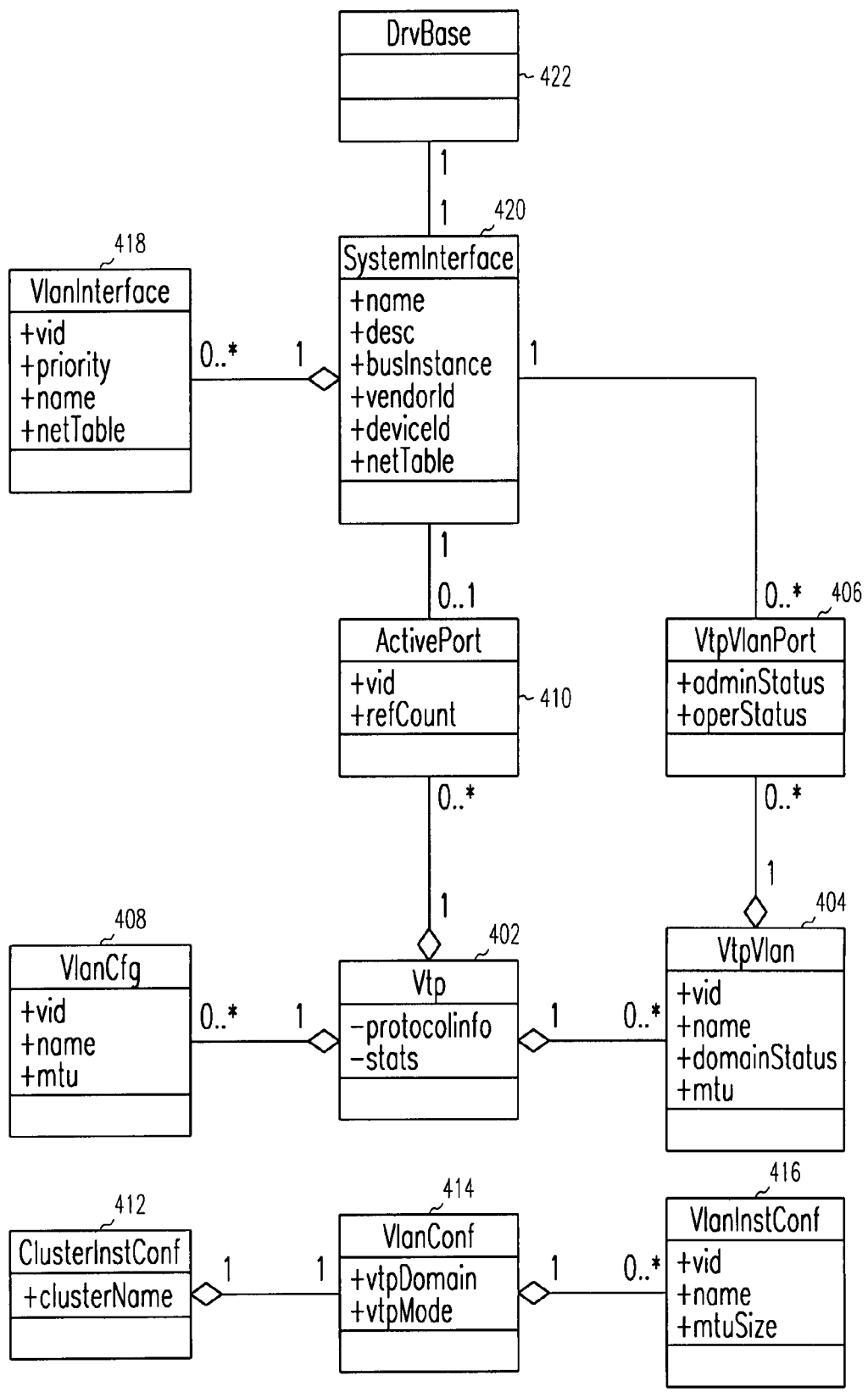
FIG. 4 is a block diagram of a class structure for maintaining a VLAN configuration according to an embodiment of the invention.

FIG. 4 is a class diagram illustrating a set of classes and data managed by VTP process 312 in some embodiments of the invention. In some embodiments, VTP class 402 is a class that represents the central authority for controlling the use of VLANs in a storage router 110. The VTP process 312 uses this class to manage one or more VLAN sessions, and to coordinate the creation and deletion of VLAN logical interfaces used within the processes of storage router 110. Vtp class 402 includes information about the specific VLAN protocol being used, and statistics regarding the VLANs.

The VtpVlan class 404 represents a VLAN that is operationally available on the system. It exists either because a VLAN was discovered using VTP (when the VTP mode is Client) or because it was configured locally (when the VTP mode is Transparent).

The VtpVlanPort class 406 represents a physical port (e.g. GE interface 211) through which the related VLAN can be accessed.

The VlanCfg structure 408 holds information about a configured VLAN in the system. In some embodiments, when a VLAN is configured locally on storage router 110, its existence is reported to the VTP process 312 by the VlanInstConf class 416 and kept as an instance of this structure. The configured VLANs are made operational (i.e. matching VtpVlan instances created) when the VTP mode is Transparent.

The ActivePort structure 410 records a request for a logical VLAN interface to access a specified VLAN over a specified physical interface, such as GE interface 211. When a VtpVlan instance 404 is created matching the requested VLAN along with a related VtpVlanPort instance 406 that matches the specified physical port, the driver for the physical interface is instructed to create the logical interface to access the VLAN. In some embodiments, an instance of this structure remains until all requests for this logical VLAN interface have been removed. When this occurs the driver is instructed to remove the logical interface.

In some embodiments, storage router 110 may be included in a networked cluster of storage routers. The ClusterInstConf class 412 represents the cluster that a storage router 110 belongs to. In some embodiments, cluster wide configuration information is kept under this node including the VLAN configuration information maintained by the VlanConf class 414 and VianInstConf class 416.

The VlanConf class 414 manages the cluster wide VLAN configuration. This includes the VTP domain name, the mode (Client or Transparent) that VTP is to operate in, and subnodes defined by the VlanInstConf class 416 that represent configured VLANS.

The VlanInstConf class 416 manages VLANs which have been configured in the cluster. In some embodiments, VLANs are typically not configured in the cluster unless the VTP mode is Transparent.

The VlanInterface class 418 is an extension to the SystemInterface table 420 to represent VLAN interfaces that are active in the system. A VlanInterface instance 418 is created when a logical VLAN interface is created by the related SystemInterface's driver (as may be directed by VTP process 312).

The SystemInterface class 420 abstracts a physical interface in the system. The application code can search the sysInterface table to find the datapath capable physical interfaces in the system (e.g. fibre-channel interfaces and GE interfaces 211) and the drivers which control them.

The DrvBase class 422, in some embodiments, implements functionality common to various network drivers in the system. This class may include flags to indicate whether the interface supported by the driver is capable of supporting VLANs, and whether the use of VLANs is enabled, i.e. configured, for the interface. In some embodiments, an instance of VTP class 402 is created to manage the VTP protocol for each VLAN enabled physical interface.

Returning to FIG. 3, in this example, storage router 110 is also configured with at least two target/LUN mappings 310.1 and 310.2. Target/LUN mapping 310.1 provides a mapping from SCSI router 105.1 to SCSI devices 140.1 and 140.2 on storage network 130. Target/LUN mapping 310.2 provides a mapping from SCSI router 105.2 to SCSI device 140.3 on storage network 130. Those of skill in the art will appreciate that other mappings are possible.

In operation of the example configuration described in FIG. 3, the VLAN implementation of the various embodiments operates to manage the SCSI router instances that hosts 127 and 128 may communicate with. For example, hosts 127.1 and 127.2 are only able to exchange data with SCSI router instance 105.1 because it is the only SCSI router instance on the same VLAN as hosts 127.1 and 127.2. Similarly, host 128 is only able to exchange data with SCSI router instance 105.2 because it is the only SCSI router instance on the same VLAN as host 128.

Figure 5A:
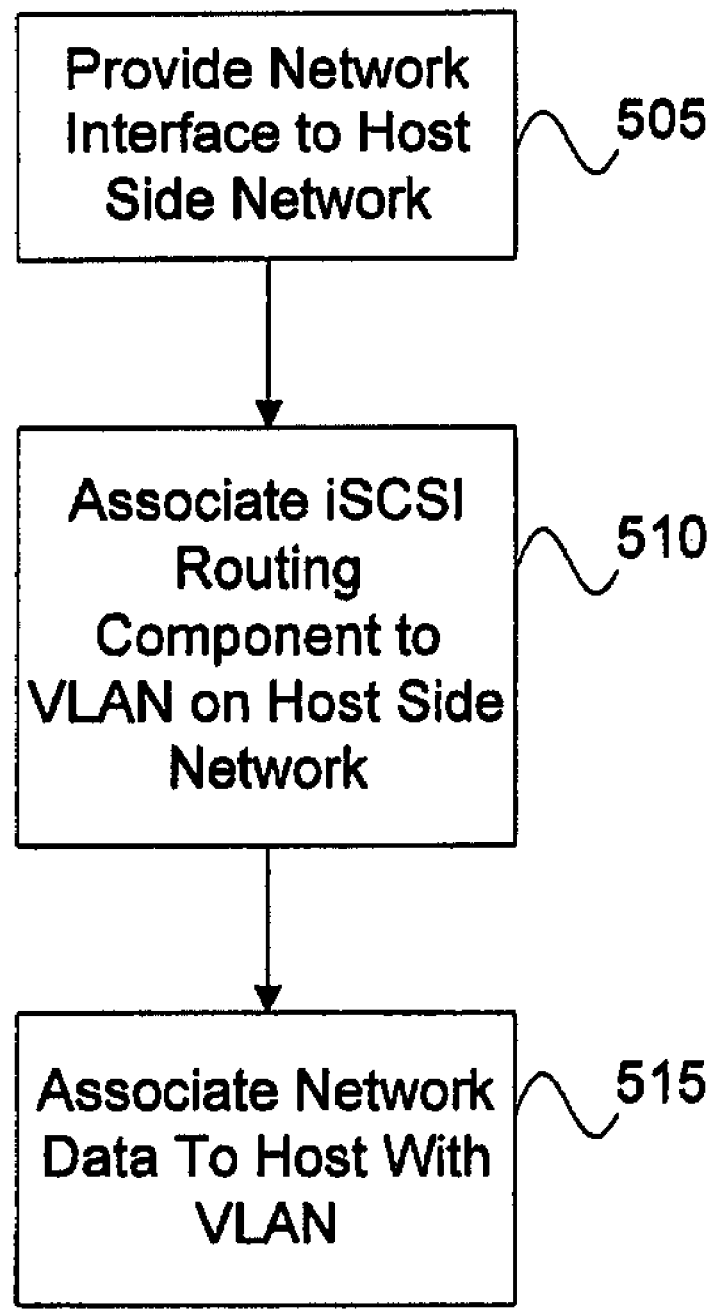
FIGS. 5A and 5B are flowcharts illustrating a method for supporting VLANs in an iSCSI environment.
Figure 5B:
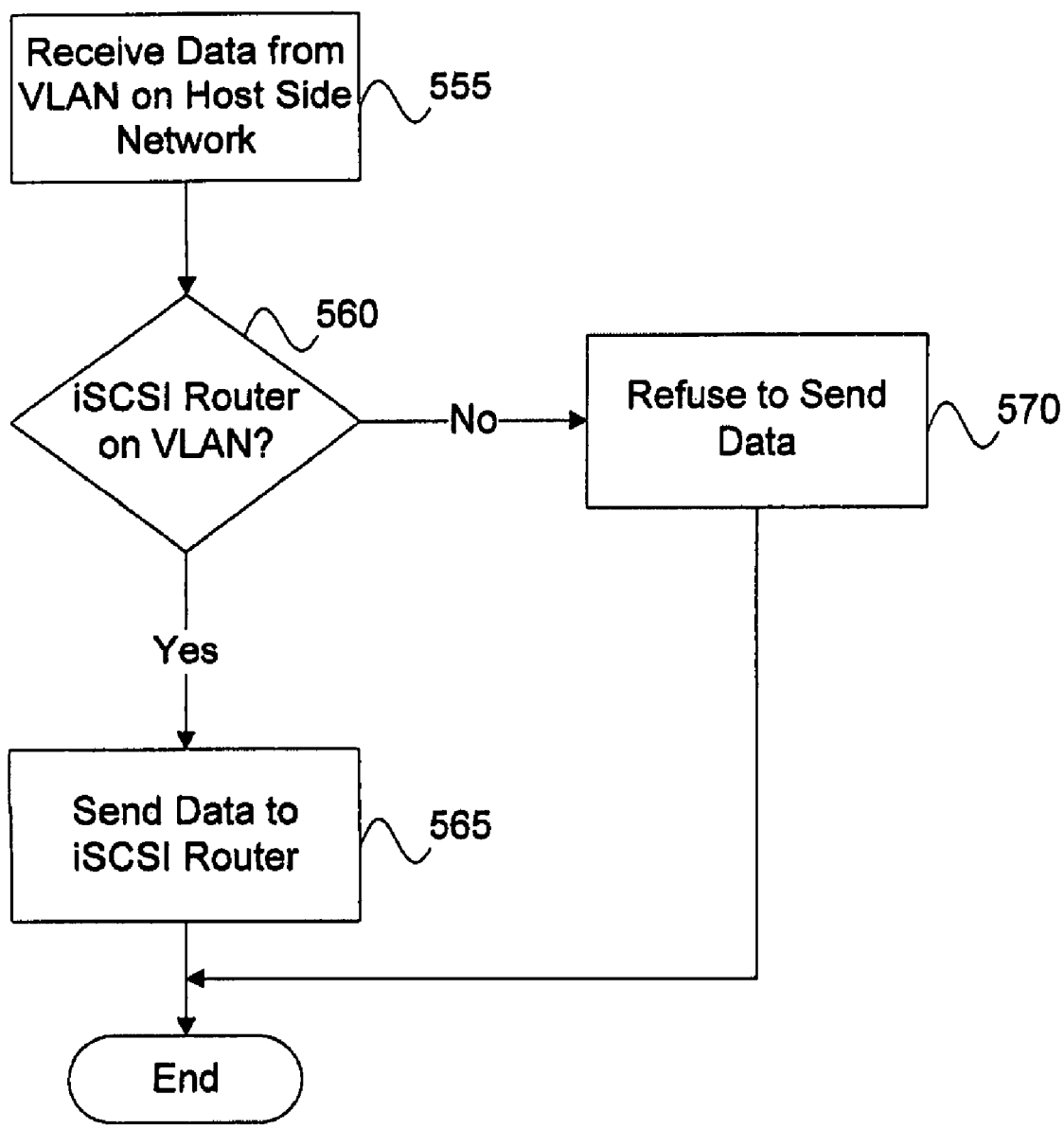

FIGS. 5A and 5B are flowcharts illustrating a method for supporting VLANs in an iSCSI environment. The methods to be performed by the operating environment constitute computer programs made up of computer-executable instructions. Describing the methods by reference to a flowchart enables one skilled in the art to develop such programs including such instructions to carry out the methods on suitable computers (the processor or processors of the computer executing the instructions from computer-readable media). The methods illustrated in FIGS. 5A and 5B are inclusive of acts that may be taken by an operating environment executing an exemplary embodiment of the invention.

FIG. 5A illustrates a method for associating an iSCSI device such as a storage router with a VLAN. The method begins by providing a network interface to a host-side network (block 505). In some embodiments, the network interface comprises a hardware component that provides VLAN capability. However, the invention is not limited, and the network interface may comprise any combination of hardware, firmware and software used to communicable a component to a network. Further, the VLAN support may reside in any combination of hardware, firmware and/or software of the network interface. For example, in some embodiments, VLAN support may be provided directly on the hardware or firmware associated with a network component. In alternative embodiments, VLAN support may be provided at a layer above the hardware, for example in a software layer that interfaces with the network hardware.

Next, the system associates an iSCSI routing component to a particular VLAN on the host-side network (block 510). In some embodiments, the association may be established by setting configuration parameters for the iSCSI routing component.

Next, any data sent from the iSCSI routing component to the host-side network is tagged with a VLAN tag for the VLAN associated in the previous block (block 515). In some embodiments of the invention, the VLAN tagging is accomplished according to the IEEE 802.1Q protocol.

FIG. 5B illustrates a method for processing data received from a host-side VLAN. The method begins when a system executing the method receives network data from a host-side network (block 555). In some embodiments of the invention, the network data will include a VLAN tag as specified by the IEEE 802.1Q protocol.

Next, a system executing the method checks to see if there is an iSCSI routing component associated with the VLAN identified by the network data (decision block 560). If such an iSCSI routing component exists, and if the IP address is bound correctly, the network data is sent to the identified iSCSI routing component (block 565).

Otherwise, the system refuses to send the network data (block 570). The fact that an invalid VLAN tag was received may be indicated in a log file, displayed on a console, or silently ignored.

Examples of articles comprising computer readable media are floppy disks, hard drives, CD-ROM or DVD media or any other read-write or read-only memory device.

CONCLUSION

Systems and methods for providing VLAN capability in an iSCSI environment are disclosed. The embodiments of the invention provide advantages over previous systems. For example, the systems and methods provide a mechanism for associating individual storage device volumes in a SAN with one or more VLANs. Although specific embodiments have been illustrated and described herein, it will be appreciated by those of ordinary skill in the art that any arrangement that is calculated to achieve the same purpose may be substituted for the specific embodiments shown. For example, the present invention has been described in the context of a storage router network device. The systems and methods of the invention apply equally as well to other types of storage area network devices having a plurality of internal and external network interfaces. This application is intended to cover any adaptations or variations of the present invention.

The terminology used in this application is meant to include all of these environments. It is to be understood that the above description is intended to be illustrative, and not restrictive. Many other embodiments will be apparent to those of skill in the art upon reviewing the above description. Therefore, it is manifestly intended that this invention be limited only by the following claims and equivalents thereof.

What is claimed is:

1. A method for accessing iSCSI targets over a network, the method comprising:

providing a network interface in a storage router having one or more processors, said network interface supporting a plurality of VLANs on a physical network;

initializing a VLAN manager process executable by the one or more processors and to manage one or more VLAN sessions on the network interface in the storage router;

initializing a first iSCSI routing component executable by the one or more processors in the storage router, the iSCSI routing component having a first network address for communicating through the network interface and further communicably coupled to a SAN (Storage Area Network) interface;

initializing a second iSCSI routing component executable by the one or more processors in the storage router, the second iSCSI routing component having a second network address for communicating through the network interface and further communicably coupled to the SAN interface;

associating the first network address of the first iSCSI routing component with a first VLAN of the plurality of VLANs, said first iSCSI routing component configured to providing a target and LUN (Logical Unit) mapping between a first host on the first VLAN to at least one device on the SAN; wherein the first iSCSI routing component is configured as a node of the first VLAN and to communicate directly to the first VLAN through the network interface using a first logical interface managed by the VLAN manager;

associating network data between the first host and the at least one device through the first iSCSI routing component with a first VLAN tag associated with the first VLAN;

associating the second network address of the second iSCSI routing component with a second VLAN of the plurality of VLANs, the second iSCSI routing component configured to providing a second target and LUN mapping between a second host on the second VLAN to the at least one device, wherein the second iSCSI routing component is configured as a node on the second VLAN and to communicate directly to the second VLAN through the network interface using a second logical interface managed by the VLAN manager; and associating network data between the second host and the at least one device through the second iSCSI routing component with a second VLAN tag associated with the second VLAN.

2. The method of claim 1, wherein associating network data comprises:

tagging an iSCSI network packet with the first VLAN tag; and sending the iSCSI network packet to a host on the first VLAN.

3. The method of claim 1, wherein associating network data comprises:
- receiving an iSCSI network packet with the first VLAN tag;
- determining if first VLAN tag is valid; and
- routing the iSCSI network packet to the at least one device in accordance with the VLAN tag.

4. The method of claim 1, wherein providing a network interface includes providing a network interface substantially conforming to the IEEE 802.1Q network protocol.

5. The method of claim 1, wherein the SAN interface is a fibre-channel interface.

6. A computerized system for accessing iSCSI targets over a network, the system comprising:
- means for providing a network interface in a storage router having one or more processors, said network interface supporting a plurality of VLANs on a physical network;
- means for initializing a VLAN manager process to manage one or more VLAN sessions on the network interface in the storage router;
- means for initializing a first iSCSI routing component executable by the one or more processors in the storage router, the iSCSI routing component having a first network address for communicating through the network interface and further communicably coupled to a SAN (Storage Area Network) interface;
- means for initializing a second iSCSI routing component executable by the one or more processors in the storage router, the second iSCSI routing component having a second network address for communicating through the network interface and further communicably coupled to the SAN interface;
- means for associating the first network address of the first iSCSI routing component with a first VLAN of the plurality of VLANs, said first iSCSI routing component configured to providing a target and LUN mapping between a first host on the first VLAN to at least one device on the SAN, wherein the first iSCSI routing component is configured as a node on the first VLAN and to communicate directly to the first VLAN through the means for providing a network interface using a first logical interface managed by the VLAN manager;
- means for associating network data between the first host and the at least one device through the first iSCSI routing component with a first VLAN tag associated with the first VLAN;
- means for associating the second network address of the second iSCSI routing component with a second VLAN of the plurality of VLANs, the second iSCSI routing component configured to providing a second target and LUN mapping between a second host on the second VLAN to the at least one device, wherein the second iSCSI routing component is configured as a node on the second VLAN and to communicate directly to the second VLAN through the network interface using a second logical interface managed by the VLAN manager; and
- means for associating network data between the second host and the at least one device through the second iSCSI routing component with a second VLAN tag associated with the second VLAN.

7. A non-transitory computer-readable medium having computer executable instructions stored thereon when executed performing a method for accessing iSCSI targets over a network, the method comprising:
- providing a network interface in a storage router having one or more processors, said network interface supporting a plurality of VLANs on a physical network;
- initializing a first iSCSI routing component executable by the one or more processors in the storage router, the iSCSI routing component having a first network address for communicating through the network interface and further communicably coupled to a SAN interface;
- initializing a second iSCSI routing component executable by the one or more processors in the storage router, the second iSCSI routing component having a second network address for communicating through the network interface and further communicably coupled to the SAN interface;
- associating the first network address of the first iSCSI routing component with a first VLAN of the plurality of VLANs, said first iSCSI routing component configured to providing a target and LUN mapping between a first host on the first VLAN to at least one device on the SAN, wherein the first iSCSI routing component is configured as a node on the first VLAN and to communicate directly to the first VLAN through the network interface using a first logical interface managed by the VLAN manager;
- associating network data between the first host and the at least one device through the first iSCSI routing component with a first VLAN tag associated with the first VLAN;
- associating the second network address of the second iSCSI routing component with a second VLAN of the plurality of VLANs, the second iSCSI routing component configured to providing a second target and LUN mapping between a second host on the second VLAN to the at least one device, wherein the second iSCSI routing component is configured as a node on the second VLAN and to communicate directly to the second VLAN through the network interface using a second logical interface managed by the VLAN manager; and
- associating network data between the second host and the at least one device through the second iSCSI routing component with a second VLAN tag associated with the second VLAN.

8. The non-transitory computer readable medium of claim 7, wherein associating network data comprises:
- tagging an iSCSI network packet with the first VLAN tag;
- sending the iSCSI network packet to a host on the first VLAN.

9. The non-transitory computer readable medium of claim 7, wherein associating network data comprises:
- receiving an iSCSI network packet with the first VLAN tag;
- determining if first VLAN tag is valid; and
- routing the iSCSI network packet to the at least one device in accordance with the VLAN tag.

10. The non-transitory computer readable medium of claim 7, wherein providing a network interface includes providing a network interface substantially conforming to the IEEE 802.1Q network protocol.

11. The non-transitory computer readable medium of claim 7, wherein the SAN interface is a fibre-channel interface.

* * * * *